United States Patent
Millar

(10) Patent No.: US 6,831,901 B2
(45) Date of Patent: Dec. 14, 2004

(54) SYSTEM AND METHOD FOR RETRANSMISSION OF DATA

(75) Inventor: Jeffrey R. Millar, Mont Vernon, NH (US)

(73) Assignee: OpenCell Corporation, Nashua, NH (US)

( * ) Notice: Subject to any disclaimer, the term of this patent is extended or adjusted under 35 U.S.C. 154(b) by 68 days.

(21) Appl. No.: 10/161,557

(22) Filed: May 31, 2002

(65) Prior Publication Data

US 2003/0226071 A1 Dec. 4, 2003

(51) Int. Cl.[7] .............................. H04J 3/08; H04J 1/10; H04J 3/12; H04B 7/14; H04Q 7/24
(52) U.S. Cl. ...................................... 370/315; 370/328
(58) Field of Search .................................. 370/315, 328

(56) References Cited

U.S. PATENT DOCUMENTS

| | | | |
|---|---|---|---|
| 4,451,916 A | * | 5/1984 | Casper et al. .................. 714/4 |
| 5,303,287 A | | 4/1994 | Laborde |
| 5,321,736 A | | 6/1994 | Beasley |
| 5,381,459 A | * | 1/1995 | Lappington .............. 455/426.1 |
| 5,400,391 A | | 3/1995 | Emura et al. |
| 5,621,786 A | | 4/1997 | Fischer et al. |
| 5,627,879 A | | 5/1997 | Russell et al. |
| 5,642,405 A | | 6/1997 | Fischer et al. |
| 5,644,622 A | | 7/1997 | Russell et al. |
| 5,657,374 A | | 8/1997 | Russell et al. |
| 5,732,076 A | | 3/1998 | Ketseoglou et al. |
| 5,761,619 A | | 6/1998 | Danne et al. |
| 5,781,541 A | | 7/1998 | Schneider |
| 5,781,859 A | | 7/1998 | Beasley |
| 5,802,173 A | | 9/1998 | Hamilton-Piercy et al. |
| 5,805,983 A | | 9/1998 | Naidu et al. |
| 5,809,395 A | | 9/1998 | Hamilton-Piercy et al. |
| 5,822,324 A | | 10/1998 | Kostresti et al. |
| 5,852,651 A | | 12/1998 | Fischer et al. |
| 6,373,887 B1 | * | 4/2002 | Aiyagari et al. ............. 375/222 |
| 6,377,640 B2 | * | 4/2002 | Trans .......................... 375/354 |
| 6,567,473 B1 | * | 5/2003 | Tzannes ...................... 375/260 |
| 2003/0043928 A1 | * | 3/2003 | Ling et al. ................... 375/267 |

FOREIGN PATENT DOCUMENTS

| | | |
|---|---|---|
| EP | 0 876 073 A2 | 11/1998 |
| GB | 2 253 770 A | 9/1992 |
| GB | 2 289 198 A | 11/1995 |
| GB | 2 315 959 A | 2/1998 |
| GB | 2 320 653 A | 6/1998 |
| WO | WO 95/33350 | 12/1995 |
| WO | WO 96/28946 | 9/1996 |
| WO | WO 97/16000 | 5/1997 |
| WO | WO 97/32442 | 9/1997 |
| WO | WO 98/24256 | 6/1998 |
| WO | WO 99/37035 | 7/1999 |
| WO | WO 01/74013 A2 | 10/2001 |
| WO | WO 01/74100 A1 | 10/2001 |

OTHER PUBLICATIONS

"Tektronix Synchronous Optical Network," *International Engineering Consortium*, [online], [Retrieved on Aug. 28, 2002], Retrieved from the Internet <URL: http://www.iec.org/online/tutorials/sonet/topic03.html>.

* cited by examiner

Primary Examiner—R. Stephen Dildine
(74) Attorney, Agent, or Firm—Hamilton, Brook, Smith & Reynolds, P.C.

(57) ABSTRACT

A received RF signal can include data information intended for transmission over a wireless communication link. The data information of the signal can be processed at a node to produce overhead bits supporting a serial transmission of the data information over a communication medium to another node. For example, the data information of the received signal and overhead bits can be combined or framed according to a serial transport protocol for transmission over the communication medium. This technique of mapping or framing the data information into a serial transport protocol is used to more efficiently transmit the data over the communication medium to a target receiver, where the original RF signal can be reconstructed.

35 Claims, 12 Drawing Sheets

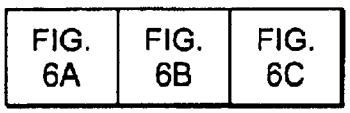

FIG. 6

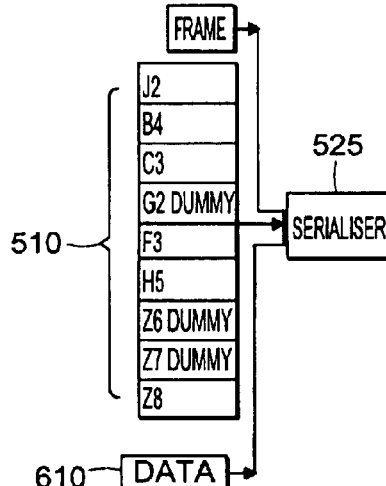

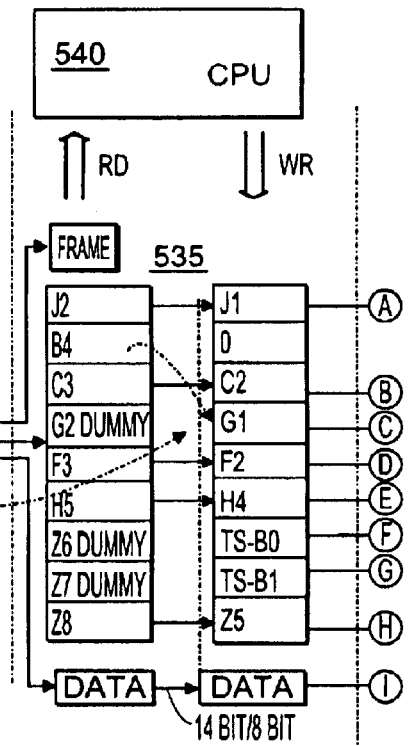

J2- PATH TRACE- 64 BYTES MESSAGE

B4- PARITY- 8 BIT PARITY OVER THE NEAR-END 16-BIT DIF FOR 8kHz FRAME

C3- PATH LABEL- HAS ONLY TWO VALVES (NOT EQUIPPED OR EQUIPPED)

G2- DUMMY- NOT USED, SEND VALUE = 0

F3- NIF LABEL- CARRY INFORMATION ABOUT NIF SUBDIVISION (SUBCHANNELS QUANTITY AND BANDWIDTH)

H5- USER DEFINED- TRANSMITTED TRANSPARANTLY TO THE FAR END

Z6- DUMMY- NOT USED, VALUE = 0

Z7- DUMMY- NOT USED, VALUE = 0

Z8- USER DEFINED- TRANSMITTED TRANSPARANTLY TO THE FAR END

J2- TRANSPARANTLY MAPPED TO - J1

B4- IF ERROR DETECTED INCREASE REI-P COUNTER

C3- TRANSPARANTLY MAPPED TO - C2

G3- IS TERMINATED

USING B4 TO GENERATE PATH REI-P AND SERDES LOL, LOS TO GENERATE PATH AIS-P IN - G2

F3- TRANSPARANTLY MAPPED TO - F2

H5- TRANSPARANTLY MAPPED TO - H4

Z6- IS TERMINATED

TIME STAMP BYTE0 IS MAPPED TO - Z3

Z7- IS TERMINATED

TIME STAMP BYTE1 IS MAPPED TO - Z4

Z8- TRANSPARANTLY MAPPED TO - Z5

FIG. 6A

SYSTEM AND METHOD FOR RETRANSMISSION OF DATA

BACKGROUND OF THE INVENTION

The wireless telecommunication industry continues to experience significant growth and consolidation. In the United States, market penetration is near 32% with approximately 86 million users nationwide. In 1999 the total number of subscribers increased 25% over the previous year, with the average Minutes of Use (MOU) also increasing by about 20% per user. If one considers growth in the digital market, in as short as three years, the digital subscriber base has grown to 49 million users, or approximately equal to the installed number of users of analog legacy systems. Even more interesting is an observation by Verizon Mobile that 70% of their busy hour traffic (an important system design parameter) is digital traffic, although only approximately 40% of the total number of their subscribers are digital users. The Verizon Mobile observation indicates the digital subscriber will drive the network design through its increasing usage, whereas the analog user is truly a passive "glovebox" subscriber. Similar growth has been witnessed in other countries, especially in Northern and Western Europe, where market penetration is even higher, approaching 80% in some areas, and digital service is almost exclusively used.

With the availability of Personal Communications Service (PCS) frequencies in the United States, and additional continuing auctions of spectrum outside of the traditional 800–900 MegaHertz (MHz) radio band, the past few years have also seen increased competition among service providers. For example, it has also been estimated that 88% of the U.S. population has three or more different wireless service providers from which to choose, 69% have five or more, and about 4% have as many as seven service providers in their local area.

In 1999 total wireless industry revenue increased to $43B, representing an approximate 21% gain over 1998. However, a larger revenue increase would have been expected given the increased subscriber count and usage statistics. It is clear that industry consolidation, the rush to build out a nation-wide footprint by multiple competing service providers, and subsequent need to offer competitive pricing plans has had the effect of actually diminishing the dollar-per-minute price that customers are willing to pay for service.

These market realities have placed continuing pressure on system designers to provide system infrastructure at minimum cost. Radio tower construction companies continue to employ several business strategies to serve their target market. Their historical business strategy, is build-to-suit (i.e., at the specific request and location as specified by a wireless operator). But some have now taken speculation approach, where they build a tower where it may be allowed by local zoning and the work with the new service providers to use the already existing towers. The speculative build spawned by the recently adopted zoning by-law is actually encouraged by communities to mitigate the "unsightly ugliness" of cellular phone towers. Towns adopted the by-laws to control tower placement since Federal laws prohibit local zoning authorities to completely ban the deployment of wireless infrastructure in a community. Often the shared tower facility is zoned far removed from residential areas, in more commercialized areas of town, along heavily traveled roads, or in more sparsely populated rural sections. But providing such out of the way locations for towers often does not fully address each and every wireless operator's capacity or coverage need.

Each of the individual wireless operators compete for the household wireline replacement, and as their dollar-per-MOU is driven down due to competition in the "traditional" wireless space, the "at home" use is one of the last untapped markets. As the industry continues to consolidate, the wireless operator will look for new ways to offer enhanced services (coverage or products) to maintain and capture new revenue.

Considering the trends that have appeared over recent years, when given the opportunity to displace the household wireline phone with reliable wireless service, a wireless service operator may see their average MOUs increase by a factor of 2 to 4, thereby directly increasing their revenue potential 200 to 400%. In order to achieve this, the wireless operator desires to gain access throughout a community as easily as possible, in both areas where wireless facilities are an allowed use and in where they are not, and blanket the community with strong signal presence.

SUMMARY OF THE INVENTION

One aspect of the present invention is directed towards retransmission techniques. In an illustrative embodiment, a received signal includes data information that is transmitted to a following node in a communication system for eventual transmission of the data information over a wireless communication link. The data information is processed by hardware that produces overhead bits supporting a serial transmission of the data information over a communication medium to a following node. For example, the data information of the received signal and overhead bits can be combined or framed according to a serial transport protocol for transmission over the communication medium. This technique of mapping or framing the data information into a serial transport protocol is used to more efficiently transmit the data over the communication medium to a target receiver.

In a retransmission system, the received signal passes from receiving hardware, over a communication link, to transmission hardware. The received signal can consist of data from an analog to digital converter (ADC). The receiving hardware also has status information about the signal, the hardware that needs to pass over the link from receiver to transmitter.

One aspect of the retransmission system involves passing the digitized signal unmodified from receiver to transmitter. The retransmission system can provide fault detection, system status, and control features to control software that manages the link. For example, the transmitter can be notified when a retransmission link contains bad data, thus, preventing transmission of corrupted signals.

Three options can be considered in the design of control, status and fault detection. A first option passing only data over the retransmission link and using a separate software to software communication channel for status. A second option is to multiplex control and status data into a serial data stream, an "inband" approach. This approach can include state machines in the data channel to find and distinguish the overhead from the data and reduces the available data rate. A third option is to pass the control and status data over a "sideband."

The SONET protocol can be used in a retransmission system since a number of commercial circuit cards include multiplexing capability at a sufficient data rate. This protocol used can include the sideband option. Specifically, SONET uses Path overhead to carry control and status information from one end of the link to another.

In one application, the signal is received in a digitized RF (Radio Frequency) format that reformatted and transmitted to a following node using a serial protocol such as SONET (Synchronous Optical Network). The original signal can be reconstructed at a downstream or receiver node using the data information. The overhead bits can be used to conform that the data is valid and provides information to manage retransmission in the network. Accordingly, one aspect of the present invention involves transmitting a digitized RF signal over SONET.

The received signal can be derived from an RF signal transmitted over a coaxial cable. More specifically, a band of frequencies of the RF signal on the coaxial cable can be down converted to produce an analog IF (Intermediate Frequency) signal that is thereafter converted using an analog-to-digital (A/D) converter. The A/D converter digitizes the IF bandwidth signal into digital words that are the data information transmitted over the serial stream. The overhead bits are added and the combined signal is sent over a high speed transport network, such as one that uses an optical fiber as the physical transmission medium. The data information and overhead bits can be received in a parallel format and converted to a serial format for transmission over the communication medium. For instance, the signal can be an analog signal that is sampled to produce 14-bit words that are converted to digital words for transmission over a serial transport protocol. At a downstream receiver node, the serial stream (that is potentially transmitted and received over an optical fiber) can be converted back into a digitized RF signal using the data information. The overhead information provides fault detection and configuration information to the transmitter hardware and its managing software. The reconstructed RF signal can then be used to drive an antenna for transmitting the data information to a target such as a cellular phone device.

Thus, one aspect of the present invention is directed towards a seamless solution for converting an RE signal for transmission over an optical link and conversion back to the RF signal for driving a remote antenna device. The use of an optical fiber provides high bandwidth for transmitting large amounts of data.

As mentioned, the serial stream can be transmitted through multiple nodes to a target receiver. In general, a node can be any point in the communication system such as a circuit component, a circuit card, or a device that processes, stores, receives or transmits data information. To aid in re-transmission from one node to another, a particular protocol can be selected for transmitting the serial stream. Based on an anticipated protocol for transmitting the serial stream at a following downstream node, at least a portion of the overhead bits generated at an upstream node can be transmitted in an allocated register of the selected transport protocol that later will be used at the downstream node. In other words, certain bits or registers of the transport protocol previously used for transmitting the serial stream from the upstream node to a downstream node can be overwritten and used for a different purpose when the serial stream is re-transmitted from a following downstream node. Consequently, registers and bits of the selected protocol can be used for different purposes from one node to the next. Upon receipt of the re-transmitted serial stream according to the selected protocol, the serial stream can be checked for configuration and transmission errors and processed to reproduce the signal as it was originally received.

In a specific application, the serial stream is initially transmitted using a Quasi-SONET protocol from one node to the next and certain registers of the Quasi-SONET protocol are used for overhead such as diagnostics and control information. This enables two nodes such as an intermediate transmitter/receiver pair to pass information between each other for maintaining a link or, on a larger scale, an overall communication system. At a node receiving the serial stream of data information, the serial stream can be further re-transmitted using the SONET protocol.

The communication medium can be a fiber optic link carrying data originally intended for transmission over an RF (Radio Frequency) antenna device to a mobile cellular phone user. Thus, a digitized RF signal can be processed for transmission to a target antenna device via the SONET protocol. The communication medium can also be a hardwired cable such as a coaxial cable or twisted pair of wires for carrying a differential signal. It should be understood that types of communication media can be connected in tandem to support propagation of the serial stream including data information and overhead bits. More specifically, the serial stream can be transmitted over a pair of differential copper wires and later converted to an optical signal transmitted over fibers, etc.

The overhead bits for transmitting the data information over the serial stream can include time stamps. In one application, the time stamps are used for location services. For example, a service provider can use the time stamp information to identify the location of a target cellular devices such as a mobile phone user. Additionally, the time stamps can be used to determine a path delay of a serial stream from one node to the next.

The overhead bits can also include parity information to identify quality of the serial stream. For example, the originally received RF signal including the data information can be processed for transmission into a serial stream using parity information such as a checksum to ensure signal integrity. Consequently, data information received in the serial stream can be checked for errors. Health of hardware or a link can also be determined using similar types of maintenance information transmitted in the overhead bits. Parity can be applied to the entire set of bits in a frame such as data bits, overhead bits and frame sync bits.

The system for communicating data information can include a hub to receive a signal from at least one base station. For example, the hub can be designed to receive signals from a base station farm including multiple base stations. As discussed, a received signal can include data information that is to be transmitted to a target by a remote antenna device. The system can include a communication medium to couple the hub and antenna device. A processor device disposed in the hub can decode the received signal to produce overhead bits supporting a serial transmission of the data information over the communication medium to the remote antenna device. Consequently, an RF signal originally intended for driving an antenna device can be repackaged (including overhead bits and the data information) based on a serial transport protocol to a remote receiver over a fiber link.

Based upon receipt of the serial stream, the original RF signal can be reconstructed at the remote receiver to drive a remotely located antenna device. This provides a seamless solution for transmitting an RF signal at the remote antenna device without needlessly degrading system performance. That is, although there is overhead processing associated with reformatting the signal for transmission to a target, the technique of transmitting the data information into the serial protocol including overhead bits enables use of a more robust media for transmitting the data information of the original signal.

One aspect of the transport protocol is to add overhead as a sideband to the data stream to avoid the complexity of time multiplexing the overhead inband with the data stream. It works out that the commercial devices typically have 16 bits available. In one application, 14 bits can be used for data, while one is used for overhead and one is used for frame sync. If 15 bit data words are used, we can move the frame sync function into the overhead bit stream. Within the commercial 16:1 serdes, the bits become time multiplexed.

The hub can include a patch panel for selecting which of multiple target antenna devices a serial stream will be directed. For example, signals from multiple base stations can be fed into the hub where they are redirected or broadcasted to one or multiple target devices. Each signal can be processed for serial transmission over a communication medium such as a fiber link to a remote receiver device including an antenna for transmitting the data information. One purpose of the patch panel is to enable an operator to manually connect input and output ports via a cable so that a serial stream is directed to a particular remote receiver and corresponding antenna device. Thus, a hub and its corresponding hardware and software functions can direct an RF signal to one of multiple remote antenna devices.

The overhead bits can be allocated for specific purposes. For example, a portion of overhead bits supported by the transport protocol can be allocated to indicate a status of a communication link. Additionally, a portion of the overhead bits can be used to control functions at a downstream node that is used to generate an RF (Radio Frequency) signal. For instance, control information can identify a frequency at which an Rf signal is to be transmitted.

In one application, the overhead bits include path trace information to identify a source of a received serial stream including data information. Additionally, the path trace information can be used to configure at least a portion of the communication system.

Most fiber-based repeater products modulate an RF signal directly onto an optical transport. While this method of transmitting RF may be viable for in-building applications, there are several factors that can be concern over a long haul. These factors include the different air interface RF links which all have very wide dynamic range performance requirements, fiber path loss varying with temperature, signal loss varying with fiber path lengths and splits, and the ease of multiplexing multiple users on a common fiber path. Use of the distributed system according to the principles of the present invention addresses these concerns, providing a highly robust and efficient backbone for transmitting a digitized signal over a serial communication medium. Accordingly, an analog RF signal can be stripped of its carrier frequency, digitized, converted into a serial format, and transmitted to a remote target device where the original RF signal is then reconstructed for driving an antenna.

Many traditional base station towers have been built to handle the antenna and base station assets of one wireless service provider. Use of a distributed RF system supporting the conversion of data and overhead bits to a serial stream protocols allows the use of multi-band antennas at remote locations. Thus, a single tenant tower can be inexpensively turned into a multi-tenant cell site, alleviating ground space constraints at tower sites. Also, the distributed RF system enables multiple base stations to share a common RF distribution backbone to transmit and receive data from remote antenna devices mounted on existing infrastructure such as low height telephone poles. Thus, a zone of RF coverage can be enlarged without signal degradation by leveraging existing infrastructure, such as fiber-optic lines and microwave spectrum, to transmit wireless signals between mobile users and network base stations.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
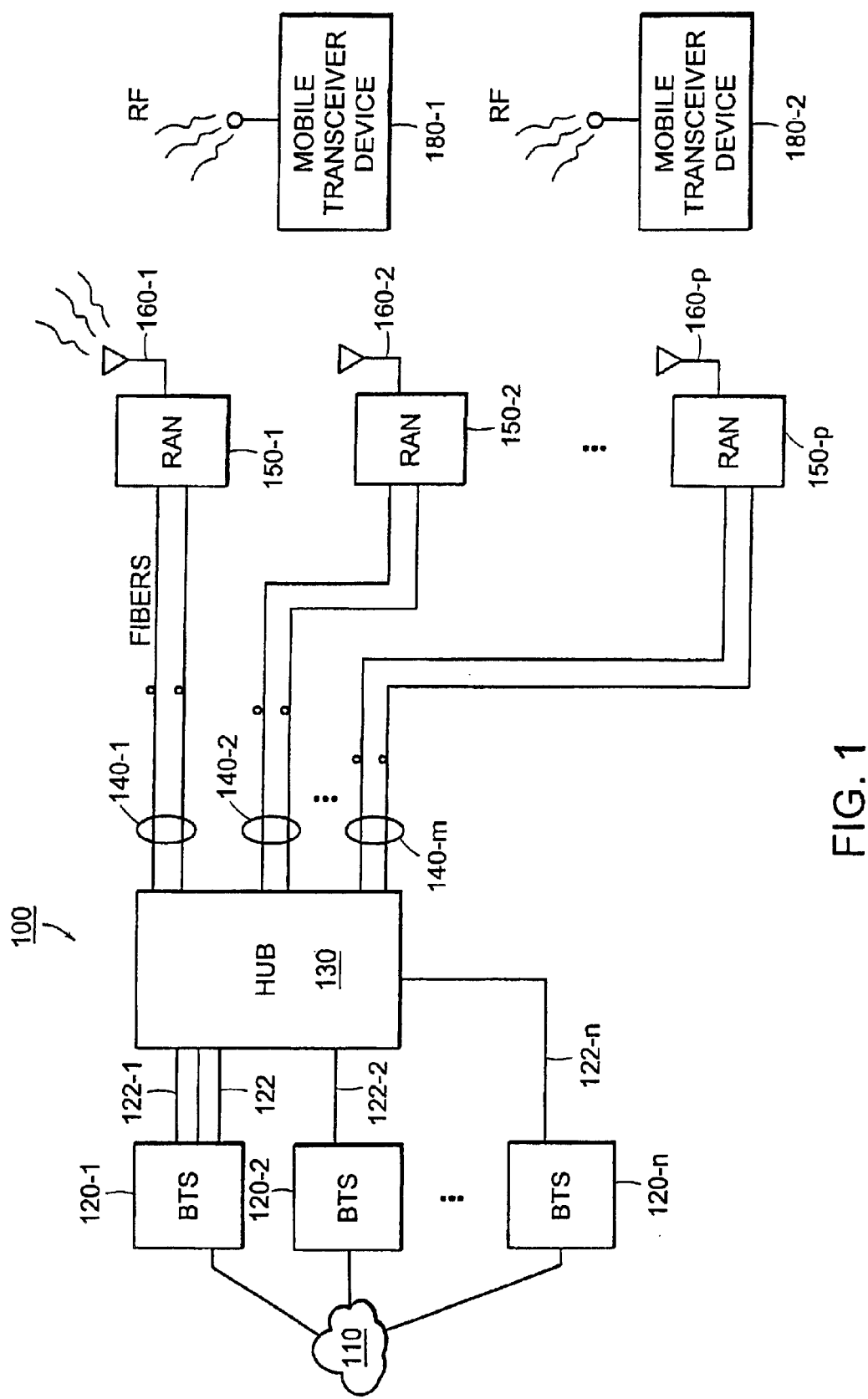
FIG. 1 is a block diagram of a communication system including a hub for retransmission of data information according to certain principles of the present invention.

FIG. 1 is a block diagram of a communication system for transmitting and receiving information between a base station and a wireless mobile transceiver device according to certain principles of the present invention. As shown, base transceiver stations (BTS) 120-1, 120-2, . . . 120-n are coupled to hub 130 via corresponding cables 122-1, 122-2, . . . 122-n.

Typically, each base station is coupled to hub 130 via one or more coaxial cables carrying digitized RF (Radio Frequency) signals. Consequently, RF signals transmitted on a coaxial cable can be transmitted in either direction between hub 130 and base stations. For example, one coaxial cable can be used to transmit a signal between hub 130 and base station 120 and another coaxial cable can be used to transmit a signal between base station 120 and hub 130.

In one application, the signals on cables 122 are formatted for relaying wireless signal information to a cellular device such as mobile transceiver 180-1 or 180-2. Hence, in the, usual arrangement in the prior art, the RE signal on cable 122 is coupled directly to an antenna device. However, in the present embodiment, instead of being coupled to an antenna device located on a base station tower, the RE signals of base stations 120 are fed (or received) to hub 130 for processing. Generally, hub 130 provides hardware and software functions to reformat the signals received over optical fibers 140 for re-transmission to a target such as one or multiple radio access nodes 150-1, 150-2 . . . 150-p. The embodiment as shown can include a fiber ring connecting a single hub 130 to multiple remote access nodes 150.

Data information representing the RF signal can be reformatted according to a serial transport protocol including overhead bits to aid in system configuration and fault detection. More specifically, hub 130 can transmit a serial stream of data representing the RF signal. The data and generated overhead bits can be transmitted over an optical fiber 140 to one or multiple radio access nodes 150. Based upon receipt of the serial stream including data and overhead information at access node 150-1, an original RF signal received on a cable 122 at hub 130 can be reconstructed for driving a remote transducer such as antenna device 160-1. In this way, a digitized RF signal received at hub 130 can be reproduced at a target access node 150, making it appear as though the original RF signal generated by a base station is seamlessly connected to a corresponding remote antenna device.

One notable advantage of the present invention is to enable a base station "farm," i.e., multiple base stations located at a common location, to transmit encoded digitized data signals to remotely located antennas. In previous applications, a base station farm would utilize antennas disposed on a local base station tower. Often such towers are unsightly because of their size. According to the principles of the present invention, radio access nodes 150 can be distributed at remote locations such as telephone poles. Thus, wireless communications can be supported using antenna devices disposed on existing infrastructure so that distributed antenna devices blend in with the environment.

It should be noted that the communication system 100 is bidirectional. In a reverse direction as discussed, an RF signal generated by radio access node 150 can be converted into a serial format for transmission to hub 130 where the original signal is reproduced and fed to the appropriate base station 120.

The RF distribution system as shown in communication system 100 can be used to provide equipment for the wireless telecommunications marketplace that extends wireless service coverage, fills wireless service coverage holes, and increases wireless service capacity. This can include the development of distributed RF system architectures, integration of multiple technologies in RF systems, RF hardware design and RF system level software. Consequently, the techniques described herein can be used to leverage existing infrastructure, such as fiber-optic lines and microwave spectrum, to transmit wireless signals between mobile users and network base stations.

Communication system 100 can be integrated to broadband transceiver and spread spectrum technologies that provide wireless telephony and network operators with substantial cost savings, deployment advantages, and performance benefits that significantly enhance the quality, reliability, and availability of their communications services.

Communication system 100 can also incorporate the techniques discussed in U.S. application Ser. No. 09/818, 986 (attorney's docket no. 3176.1000-001), entitled "Multi-Protocol Distributed Wireless System Architecture," filed on Mar. 27, 2001, which itself claims the benefit of U.S. Provisional Application No. 60/192,186, filed on Mar. 27, 2000 and U.S. application Ser. No. 09/821,820 (attorney's docket no. 133176.1001-001), entitled "Operations and Maintenance Architecture for MultiProtocol Distributed System," filed on Mar. 29, 2001, which itself claims the benefit of U.S. Provisional Application No. 60/192,870, filed on Mar. 29, 2000, the entire teachings of all of which are incorporated herein by this reference.

Figure 2:
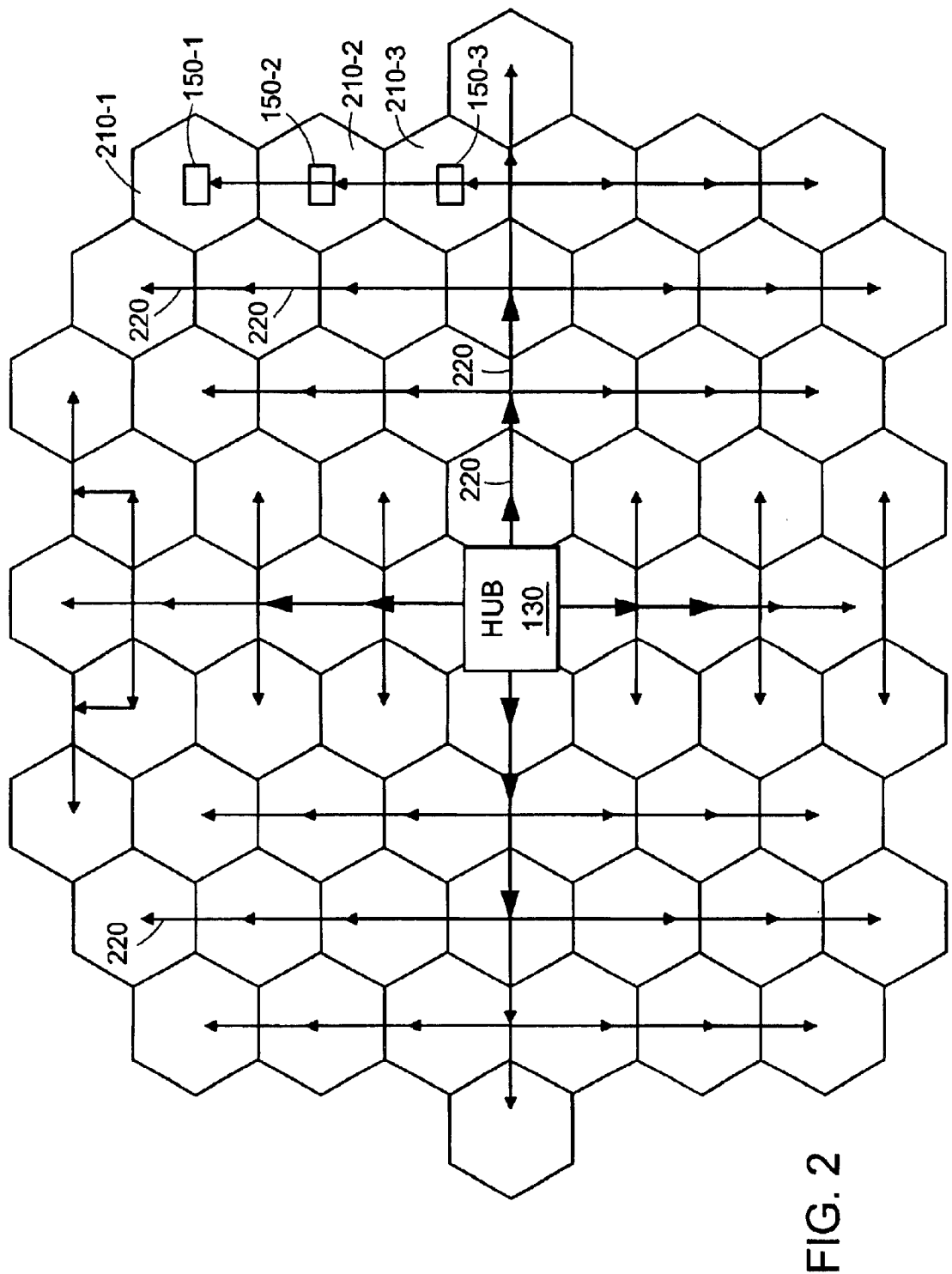
FIG. 2 is a diagram of a cellular site plan including a hub for coupling multiple base transceiver stations to radio access nodes located in corresponding cells according to certain principles of the present invention.

FIG. 2 is a site plan for a particular region. The site plan shows multiple adjacent cell sites including radio access nodes 150 and corresponding antenna devices 160 according to certain principles of the present invention. As shown, hub 130 couples base stations 120 (see FIG. 1) to radio access nodes 150 via fibers 220. Hub 130 can be configured so that signals generated by a base station can be re-transmitted to one or multiple radio access nodes at the same time. Consequently, a wireless signal can be transmitted from multiple antenna devices at the same time to increase a wireless signal coverage in a selected area. Additionally, hub 130 can be configured so the multiple wireless service providers generating signals at different base stations can share use of a radio access node 150 for generating wireless signals to mobile transceiver devices 180.

Each radio access node 150 can provide open access for multiple Wireless Service Providers (WSPs) simultaneously so that they do not interfere with each other. In residential areas where zoning issues impede construction of new conventional towers to provide wireless service coverage, components of communication system 100 can be used to interconnect base station hubs to multiple low-height utility poles which are distributed throughout the coverage area. In urban areas where increased wireless service capacity is required, communication system 100 can be used for "cell-splitting" by interconnecting base station hubs to multiple low-height utility poles, building rooftops, and other existing infrastructure to maintain high availability of spectrum to users in smaller, more numerous coverage zones.

Communication system 100 can be a multi-frequency, multi-protocol wireless access network providing cellular, PCS and wireless data coverage via a distributed fiber access system. In specific applications, communication system 100 can be modified to accommodate current wireless protocols such as TDMA, CDMA, GSM, MEN and iDEN as well as next generation 3G wireless protocols such as GPRS, 1XRTT, EDGE, 3XRTT, and W-CDMA. For example, system 100 can operate in the licensed cellular (800 MHz) and PCS (1900 MHz) bands and be forward compatible to support international frequency bands of 900 MHz and 1800 MHz, and unlicensed frequency bands, including 700 MHz, ISM (900/2400 MHz), MMDS (2.8MHz) and UUNII (5.8GHz).

Figure 3:
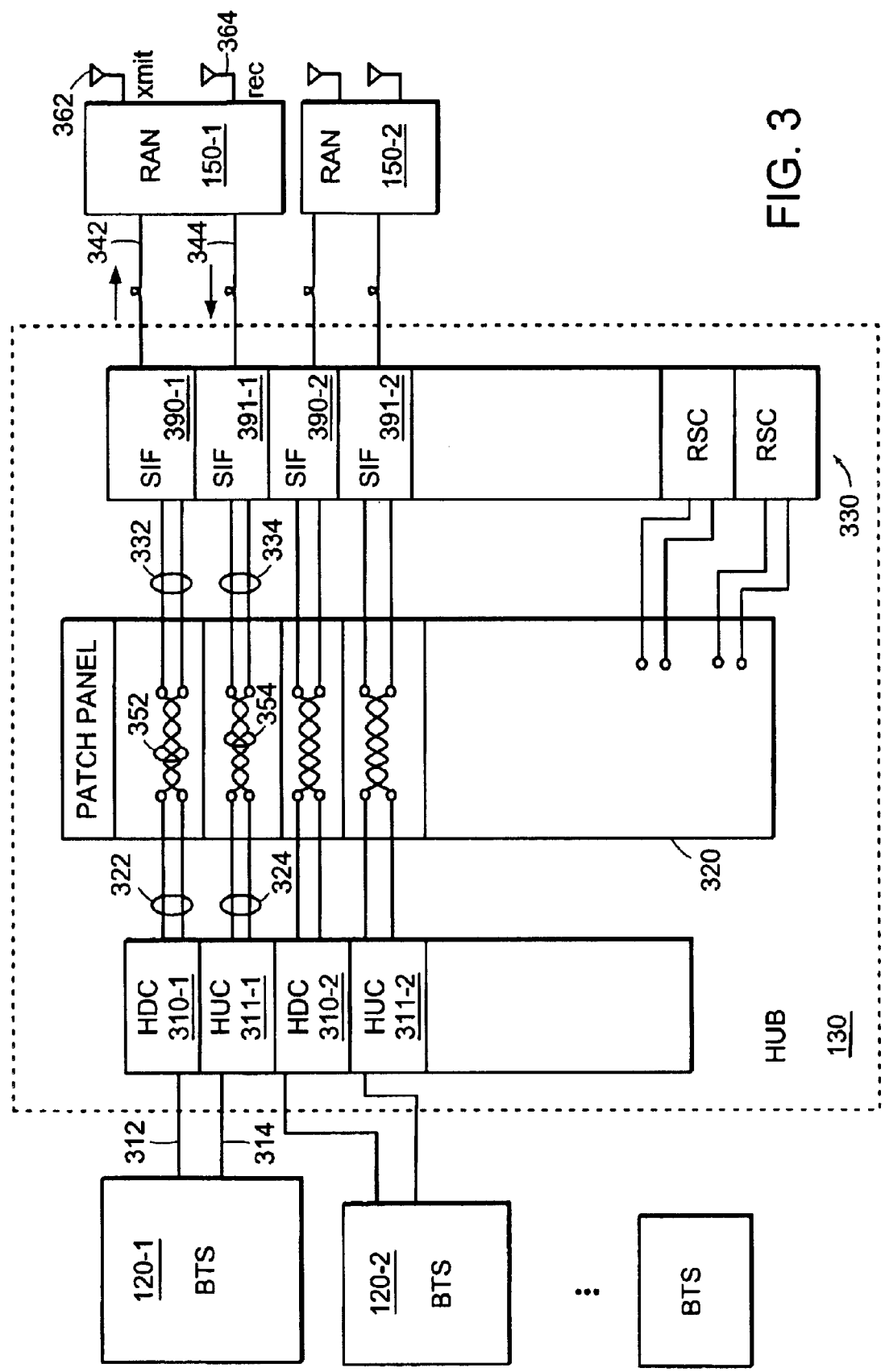
FIG. 3 is a detailed block diagram of a hub according to certain principles of the present invention.

FIG. 3 is a more detailed block diagram of a hub according to certain principles of the present invention. As shown, base transceiver station 120-1 is coupled for transmitting and receiving data streams from radio access node 150-1 through patch panel 320. In general, patch panel 320 includes a multiple pairs of differential input/output ports for coupling a base station 120 to a remote access node 150. Cables 352 and 354 are jumpers that couple a base station to a particular target. Typically, cables 352 and 354 as well as cables to and from patch panel 320 are differential pairs designed to propagate high speed serial digital signals. Shields can be included around the differential pairs of wires for signal integrity.

In a forward direction, base transceiver station 120-1 generates an RF signal based on a standard protocol. For example, any suitable protocol such as TDMA (Time Division Multiple Access), CDMA (Code Division Multiple Access), GSM (Global Satellite Mobile) can be used for transmitting and receiving signals to and from a mobile transceiver. In one application, the signal received at hub 130 through cable 312 has a carrier frequency of 1.96 Ghz (Gigahertz). Characteristics of the signal on cable 312 can vary depending on the application.

The RF signal transmitted by base transceiver 120-1 is coupled via coaxial cable 312 to hub 130 and, more specifically, hub down converter 310-1. Upon receipt, hub down converter 310-1 converts the forward RF channel to an IF (Intermediate Frequency) that can be digitized. It should be noted that each hub down converter can support multiple separate RF channels.

Hub down converter 310-1 and related circuitry generate a serially formatted, differential signal on to a twisted wire pair 322. The differential signal is coupled via jumper cable 352 to twisted wire pair 332 and serial interface 390-1 such as a SONET (Synchronous Optical Network) transmitter. Serial interface 390-1 then retransmits a received signal via a serial protocol such as SONET STS-12 that operates at 622.08 megabits per second.

Serial interface 390-1 generates an optical signal over fiber 342 to radio access node 150 where the received optical signal is converted back into RF format for driving antenna device 362. It should be note that use of a particular communication medium is merely exemplary. For example, fiber cable 342 and other media can be replaced with any other suitable media for carrying data information.

In a reverse direction, radio access node 150 can receive wireless signals and format them for serial transmission over fiber 344 to serial interface 391-1. In turn, serial interface 391-1 can transmit the serial stream of received information over cables 334, 354 and 324, respectively, to hub up converter 311-1. Hub up converter 311 can convert a received serial stream of data and overhead bits to an original or near original RF signal that is fed to base transceiver station 120-1.

Figure 4:
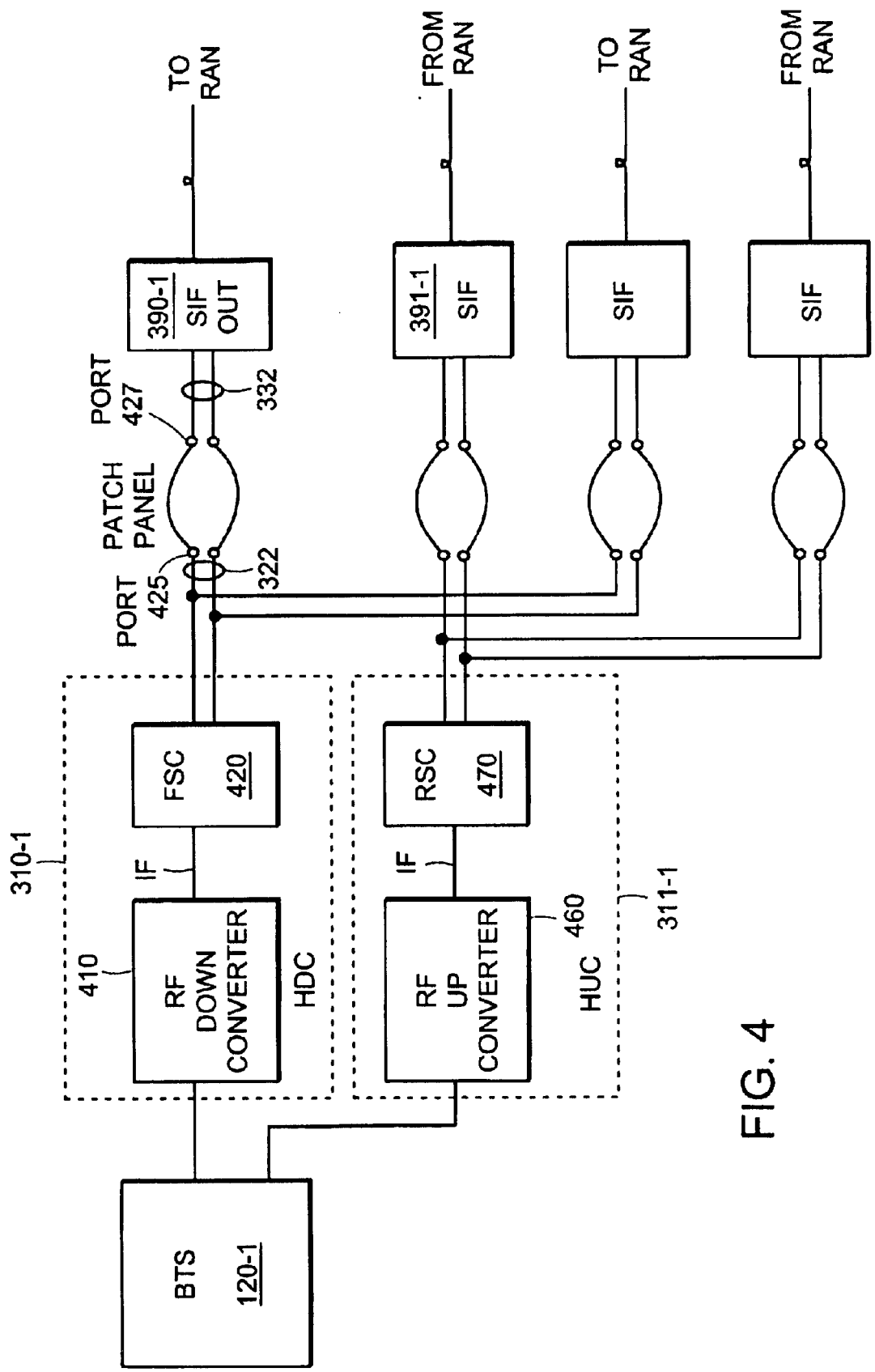
FIG. 4 is a detailed block diagram of a base station generating an RF signal that is processed and repackaged for serial transmission to a remote access node over an optical fiber according to certain principles of the present invention.

FIG. 4 is a block diagram illustrating a hub down converter and related circuitry according to certain principles of the present invention. More specifically, hub down converter 310-1 includes an RF down converter 410 for stripping away a carrier signal of the signal received over cable 312. As a result of down converting, an IF (Intermediate Frequency) signal is produced and coupled to forward simulcast card 420. More details of processing the IF signal are illustrated in the following figures.

It should be noted that outputs of forward simulcast card 420 can include separate drivers so that a copy of the same signal is transmitted over multiple ports of patch panel 320.

Figure 5A:
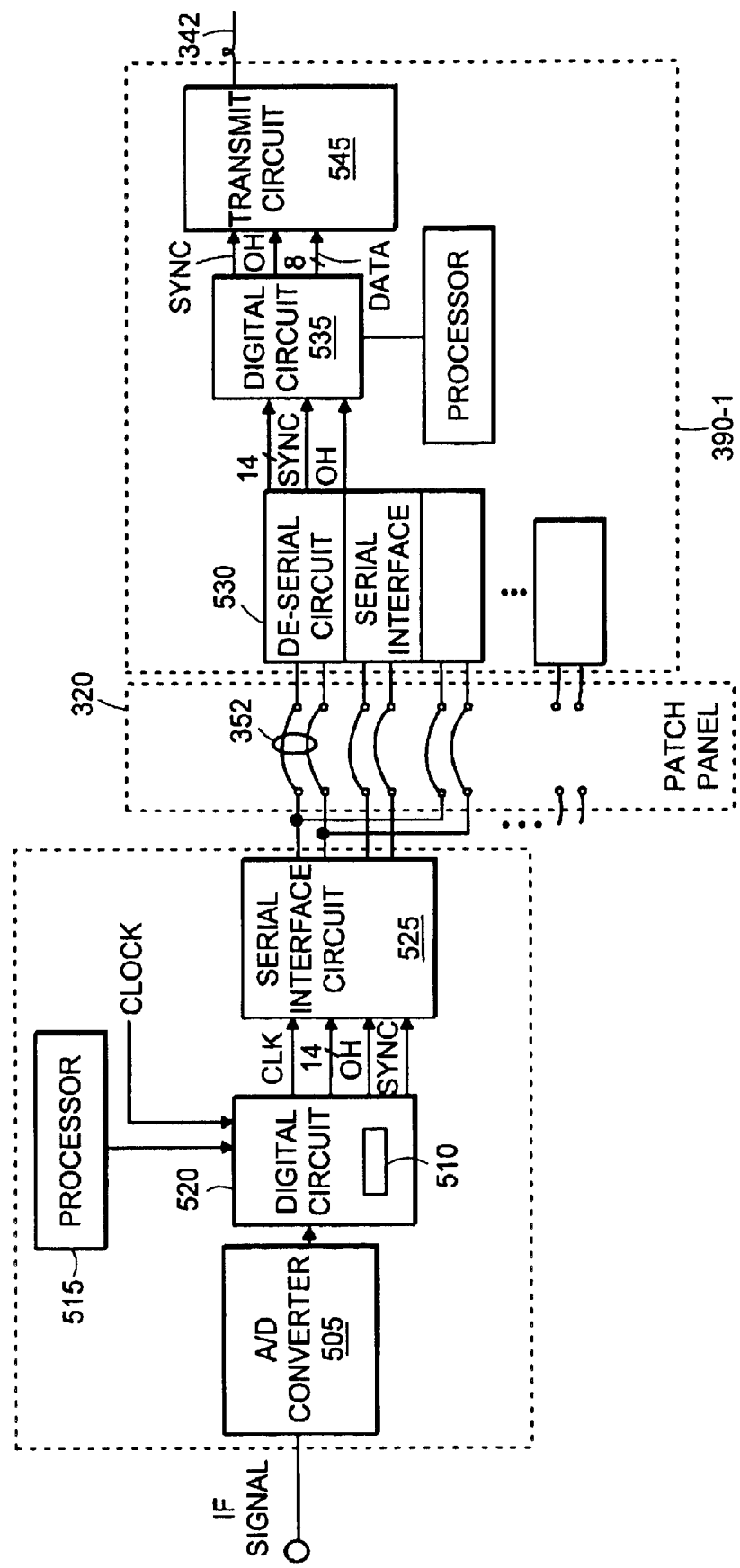
FIGS. 5A and 5B are yet more detailed block diagrams illustrating a process of converting an analog signal, reformatting the analog signal into digital information for transmission over an optical fiber, and reconstructing the original analog signal at a terminal node according to certain principles of the present invention.

FIG. 5A is a more detailed block diagram illustrating how an IF signal is processed according to certain principles of the present invention. In general, the output of circuit 530 includes a recovered clock signal received by circuit 525. This clock signal also flows from circuit 530 to circuit 545.

As shown, IF signal or any other suitable analog signal is fed into A/D (Analog-to-Digital) converter 505. The IF signal is sampled to produce a digitized RF signal. For instance, IF signal can be sampled at a rate of 42.912 MHz and to produce sample words of 14 bits wide.

The sample words or data information of the analog signal is fed to digital circuit 520 for processing. In general, digital circuit 520 in conjunction with processor 515 will prepare the data for transmission over serial interface circuit 525 such as a National 16:1 SER/DES part number DS92LV16 operating at a speed of 772.416 MHz (42.912 MHz*(16 bits+start bit+stop bit)).

Figure 8:
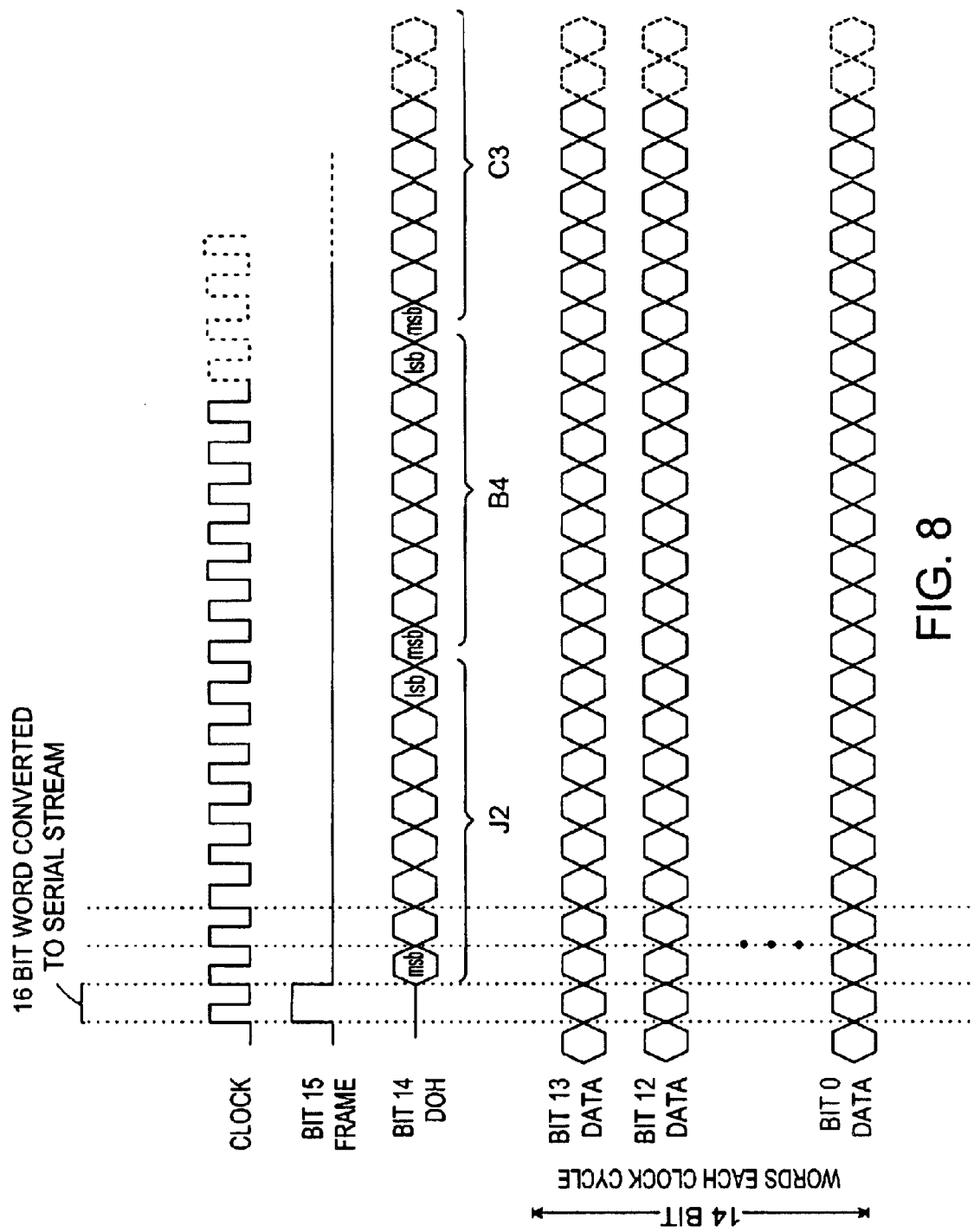
FIG. 8 is a timing diagram illustrating a method of grouping data bits and overhead bits for transmission over a serial stream according to certain principles of the present invention.

FIG. 8 is a timing diagram illustrating how data information is grouped and converted for serial transfer over cable 352. Data bits 13 . . . 0 represent a single 14-bit sample word that is grouped with two other bits for serial transmission. One bit is an overhead bit in registers 510 as shown. The other bit is a frame bit that is used to identify the beginning of a frame. For each clock cycle, a 16-bit word is clocked into a serial output register for transmission over differential pair cable 352.

Figure 9:
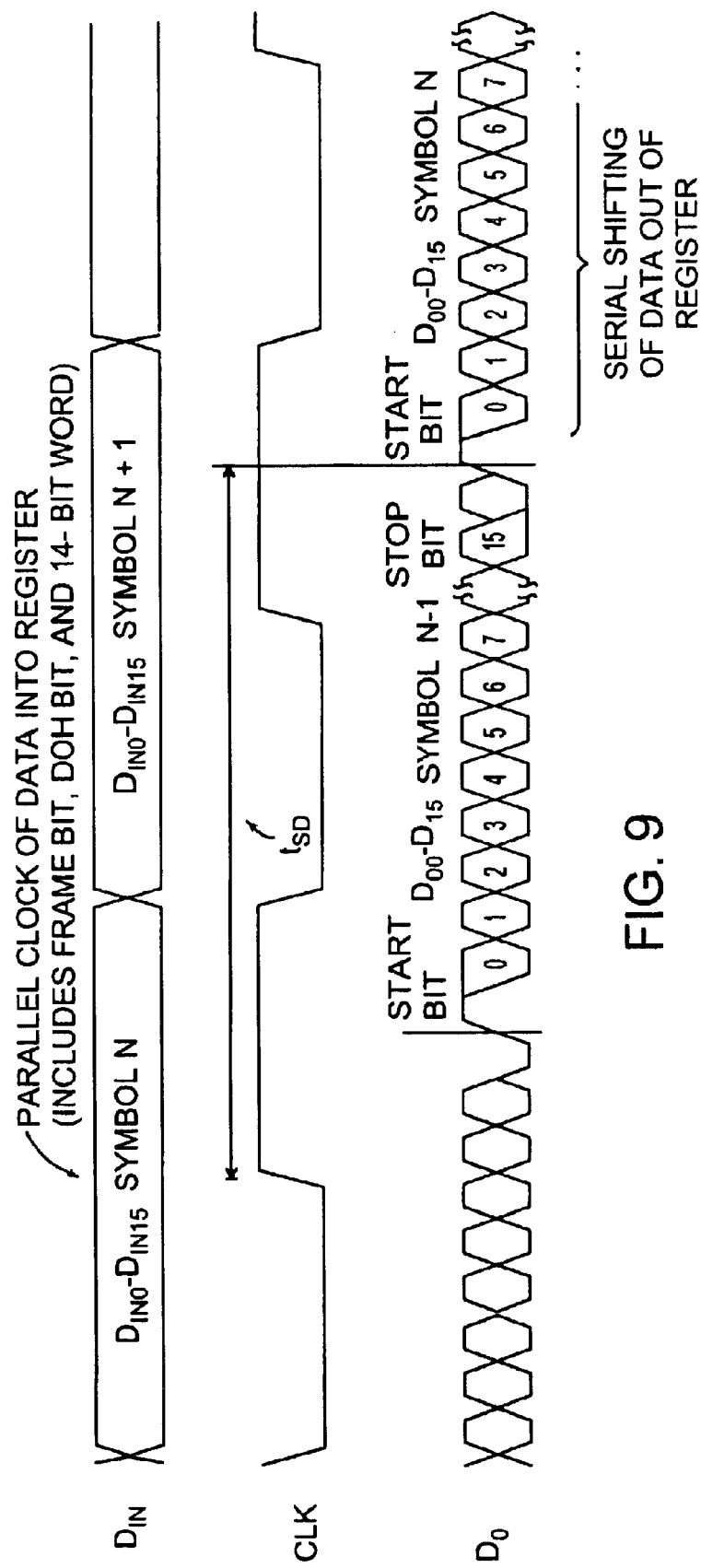
FIG. 9 is a timing diagram illustrating a serial transmission of data bits and overhead bits according to certain principles of the present invention.

FIG. 9 illustrates a 16-bit data word that is clocked into serial interface circuit 525. A start and stop bit are added to the data word. These bits are then serially transmitted over cable 352 to de-serializer circuit 530 that converts the byte information back to its original format.

Referring again to FIG. 5A, digital circuit 520 can be an ASIC (Application Specific Integrated Circuit) or Field Programmable Gate Array (FPGA) device including digital overhead registers 510. The overhead bits or information in register 510 can be used, at least in part, to support the transfer of data information base don a selected serial transport protocol.

In one application, register 510 mirrors or at least partially reflects use of overhead bytes used in a SONET protocol. However, some of the bits are used for different purposes from one node to the next rather than being used as narrowly specified by a SONET protocol. Consequently, serial interface circuit 525 can transmit the data information to a downstream node using a quasi-SONET overhead protocol and SONET-derived clock rate. This aspect of the invention will be discussed in more detail in FIGS. 6A–6C.

Digital circuit 520 drives the 14-bit data words, overhead bit information in registers 510, and sync signal to serial interface 525. In turn, interface 525 generates a differential signal through selected ports of patch panel 320 to deserializer circuit 530, which also can be a DS92LV16 chip.

It should be noted serial interface 525 can simultaneously drive multiple deserializer circuits through patch panel 320. One feature of forward simulcast card is to generate up to 8 copies of the analog IF signal. Consequently, a signal from a single base station can be regenerated at multiple radio access nodes for better coverage of an RF signal to a receiver device. A single base station 120 can drive information to multiple radio access nodes 150. Also, multiple base stations can drive signals to a single radio node 150.

Deserializer circuit 530 passes the information received over the differential signal including data and overhead bits to digital circuit 535. In conjunction with processor 540, digital circuit 535 forward the data and overhead information to transmitter 545, which can be an optical source such as a laser or diode device for transmitting a signal over optical fiber 342. Circuit 545 can also be a SONET multiplexor that combines several connectors 352 onto a single fiber so that there are multiple serial interfaces 390 driving a single fiber 342. Prior to driving, digital circuit 535 can repackage information in the 14-bit data words into 8-bit data words that are framed by transmitter 545 for transmission over fiber 342.

In a specific application, transmitter 545 is a SONET framer device that transmits an optical signal on fiber 342 or other communication medium to a target device. Transmission of information over fiber 342 can be based on OC-48 or any other suitable standard. Fiber 342 can be shared by multiple transmitters generating an optical signal at different wave lengths so that multiple base stations can drive a signal to a common radio access node 150.

A path from hub 130 to a radio access node can include a SONET ring. For example, a pair of fibers to and from hub 130 to radio access node 150 can form a ring network. From a top view, distributed RF system can be viewed as a star network. That is, multiple individual connections can be made from hub 130 to each of multiple remote access nodes 150.

Figure 5B:
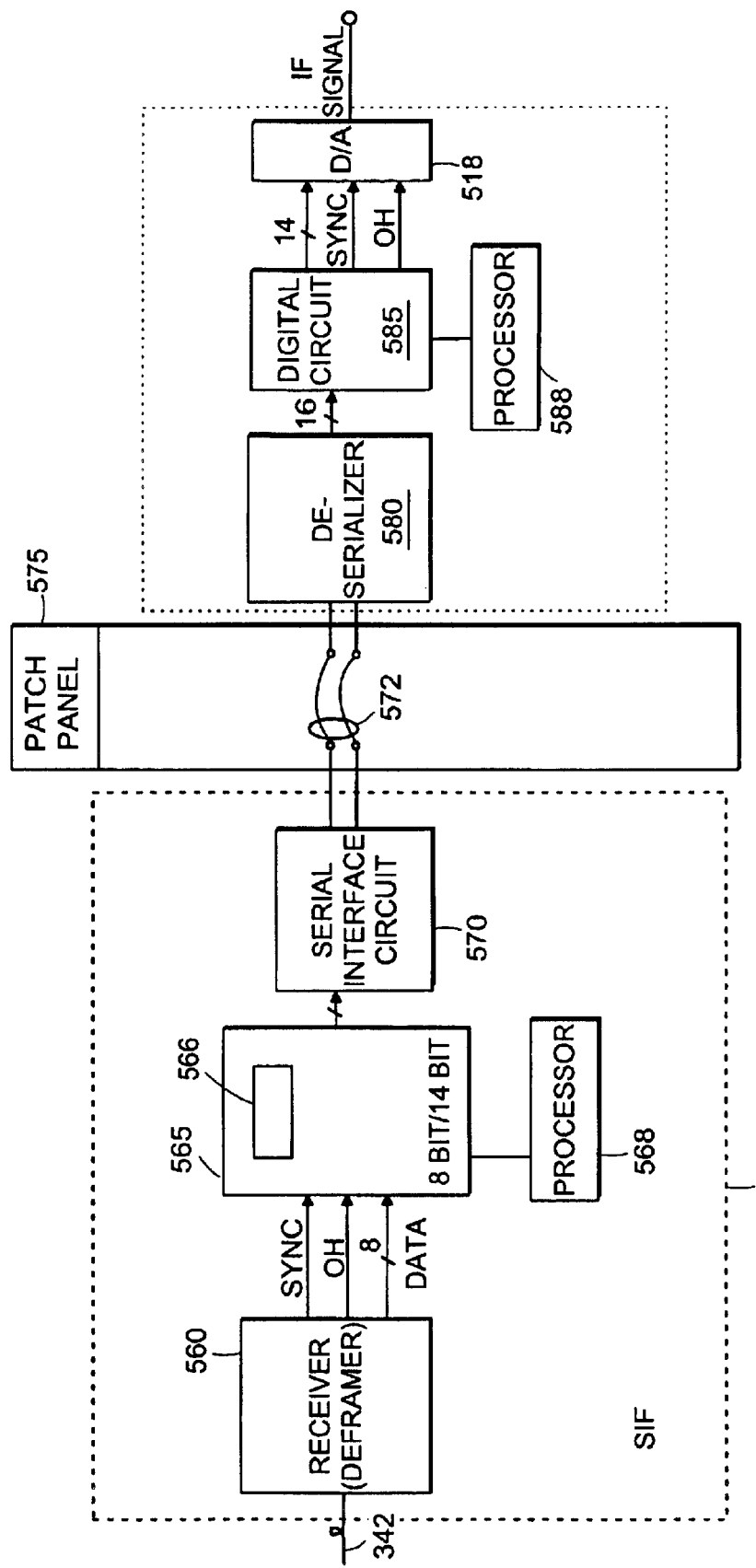

FIG. 5B is a detailed block diagram of internal components of a radio access node according to certain principles of the present invention. In general, an optical signal is received to produce an IF output signal that matches or substantially matches an IF signal at the input of A/D converter 505 as previously discussed. Receiver circuit 560 recovers the data clock received from circuit 545 and the clock flows from circuit 530 to circuit 570. Circuit 580 recovers the clock from the signals and propagates it to circuit 585 and circuit 518.

Receiver circuit 560 receives the optical signal transmitted over optical fiber 342. The received signal is converted to retrieve the serial stream of data information and overhead bits according to the selected serial protocol. As a result, digital circuit 565 in conjunction with processor 568 processes and repackages the signal for a downstream node as previously discussed. For example, digital circuit 565 tracks the overhead information stored in registers 566 and transmits the information to serial interface circuit 570, which in turn drives a differential signal through patch panel 575 via jumper cable 572.

In a similar manner as previously discussed, deserializer 580 transmits the formatted data and overhead information to digital circuit 585 and processor 588. The overhead information is stripped away and the data information is reformatted to 14-bit words as originally generated by A/D circuit 505.

Based on the 14-bit data words, D/A (Digital-to-Analog) converter 518 generates the original IF signal. This analog signal can then be modulated onto an original RF carrier frequency so that the RF signal generated by base station 120-1 is now coupled to antenna device 160 for transmission to mobile transceiver 180.

Overhead bits in a serial stream can indicate characteristics of the original RF signal such as its carrier frequency, originating source, protocol, etc. Additionally, the overhead bit information can be used to identify to which antenna device a serial stream is directed. For example, an address can be included indicating a destination to which a reconstructed RF signal, or the stream itself, will be directed or routed.

Figure 6B:
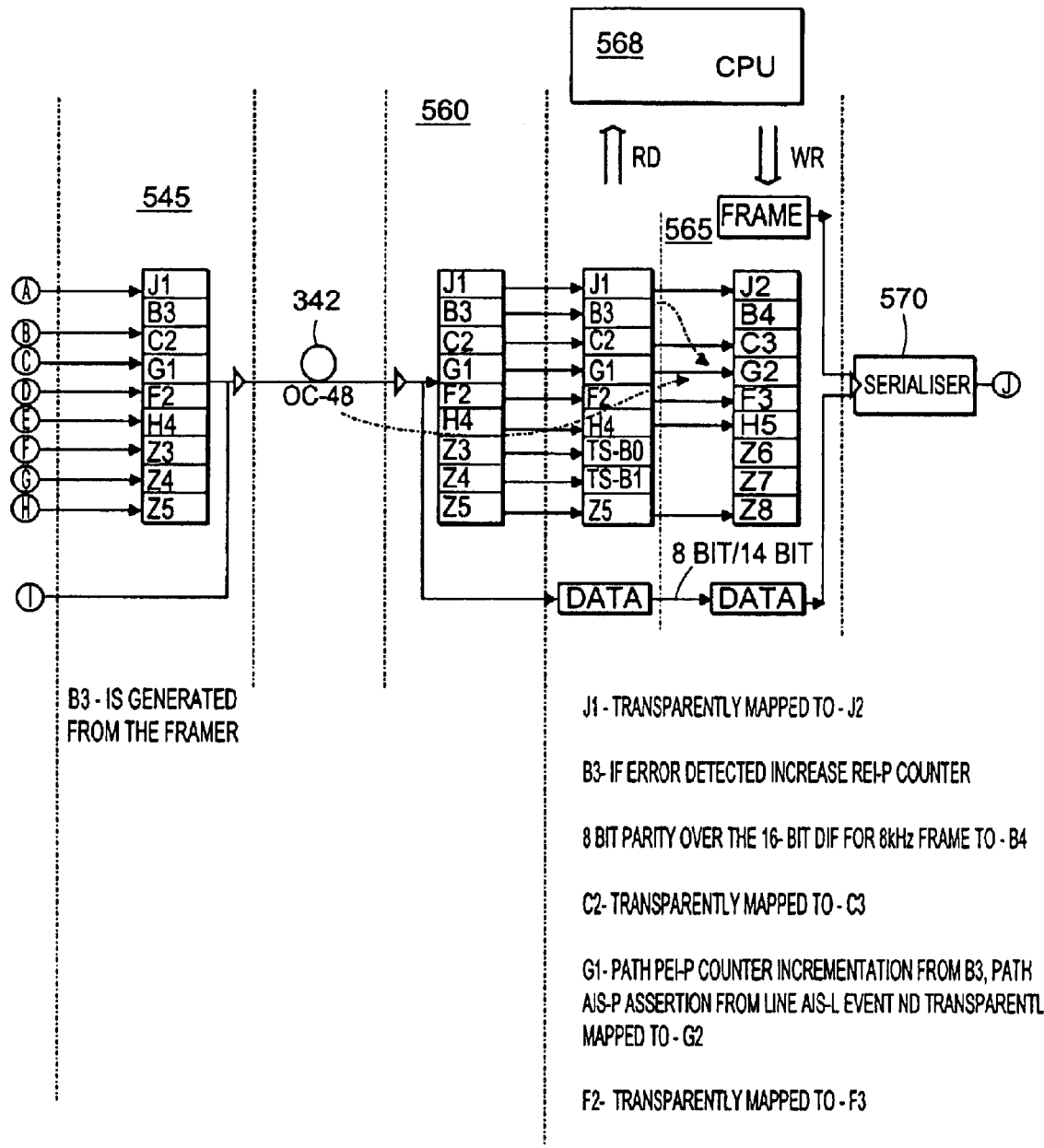
FIG. 6 is a block diagram illustrating multiple stages (FIGS. 6A–6C, sequentially) of a communication system in which a received signal is reformatted to include overhead information for serial transmission of the data information according to certain principles of the present invention.
Figure 6C:
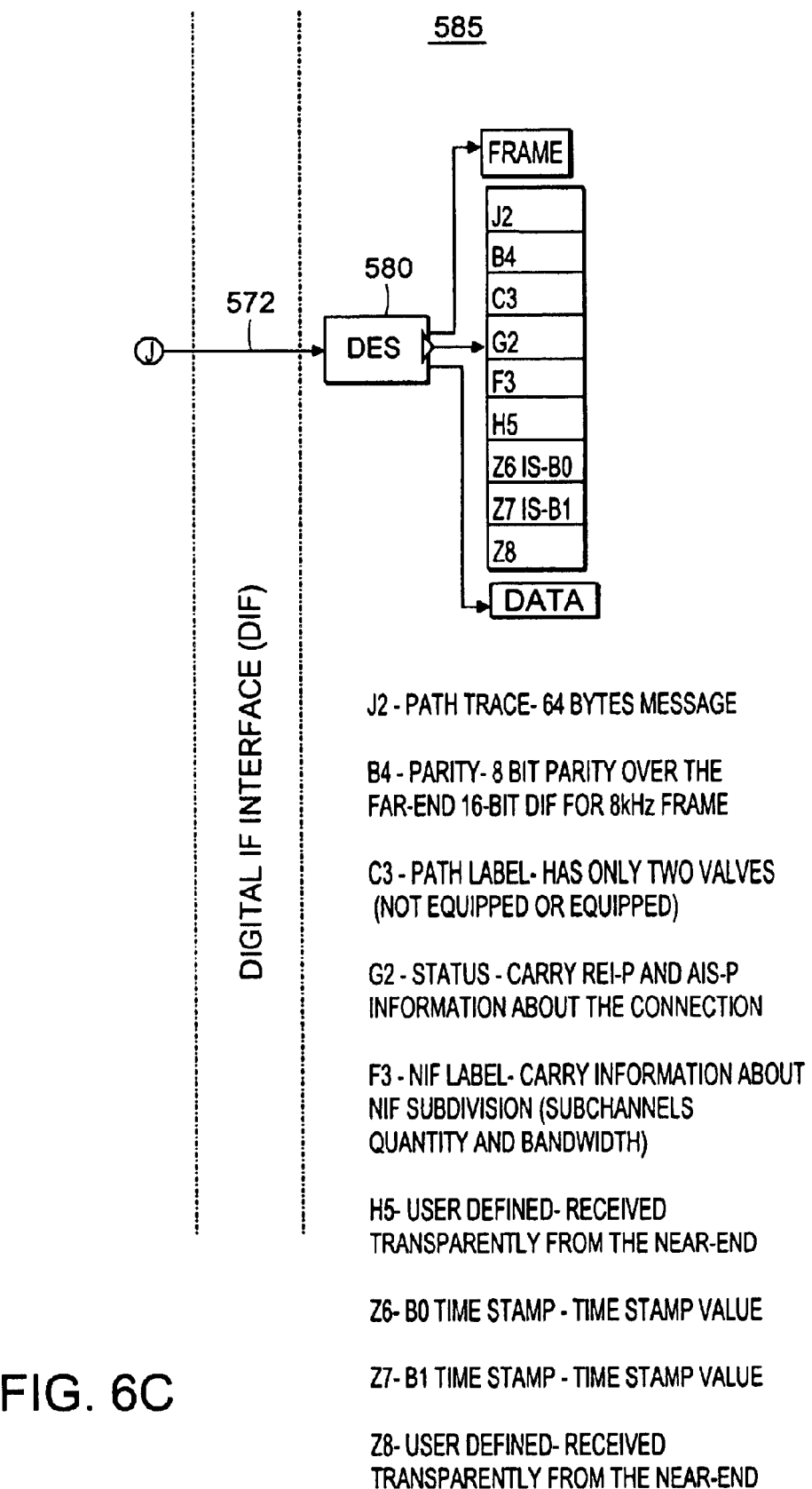

FIGS. 6A–6C illustrate how digital IF signal words are formatted to include overhead bits that are sent via a downstream transport protocol. In general, information is directed to successive stages such as nodes for data processing. It should be noted that a node can be any point in the communication system such as a circuit component, a circuit card, or a device that processes, stores, receives or transmits data information from one point the next. Hence, the term 'node' is not limited to merely remote access nodes 150, although a remote access node is one type of node in communication system 100.

At a first node including digital circuit 520, data words 610 are combined with information from software or hardware to produce overhead bits that are stored in registers 510. Each register can be one byte so that there are 72 overhead bits of information transmitted for each of 5364 14-bit data words received from A/D converter 505.

Figure 7:
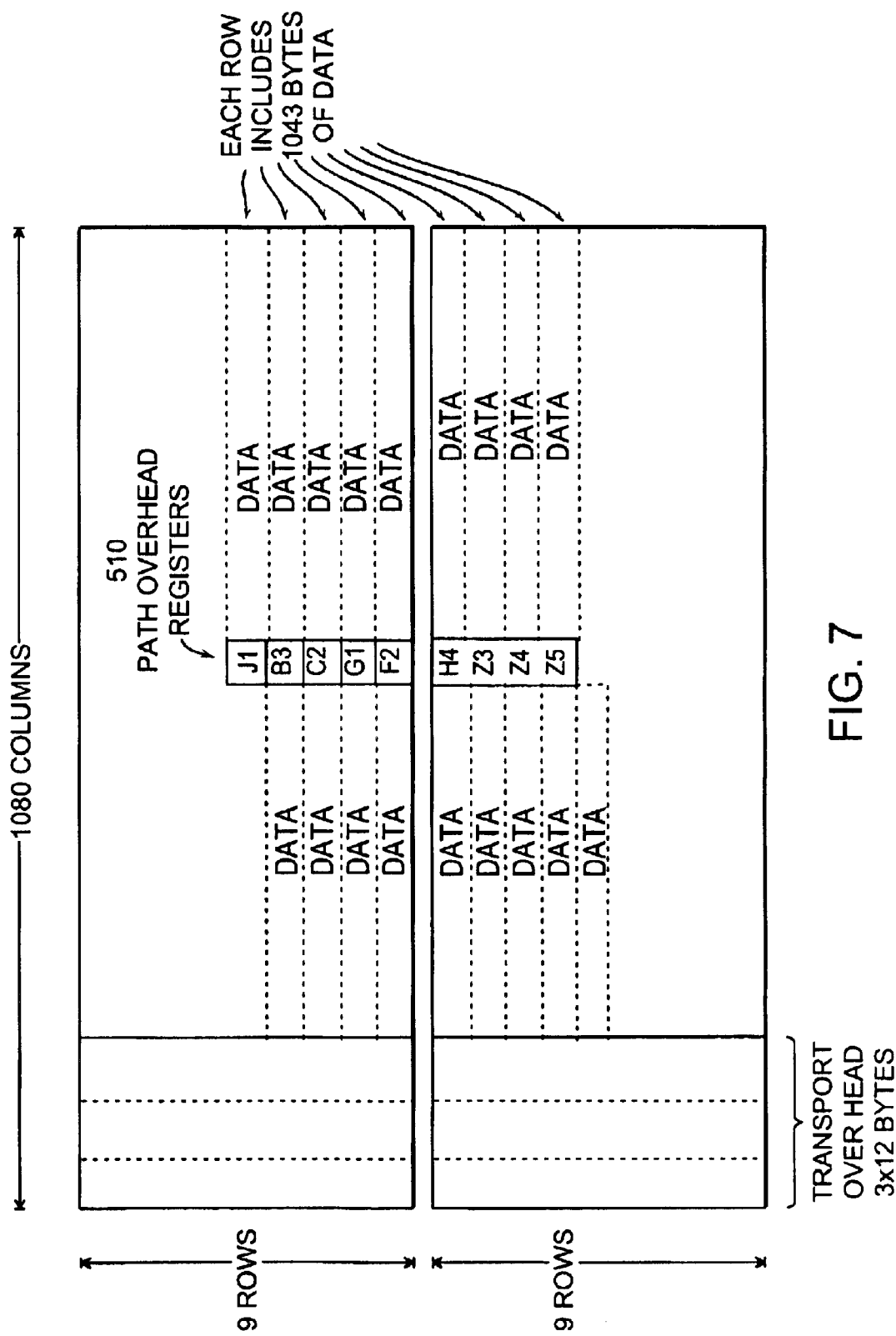
FIG. 7 is a timing diagram illustrating a STS-12C SONET protocol for transmitting data information.

FIG. 7 is a timing diagram illustrating a data bits and path overhead bits transmitted according to a SONET STS-12C protocol. Bit information is transmitted row by row, left to right. Each column holds a single byte and 9 rows of columns make up a frame transmitted in 125 microsecond. Thus, a frame rate is 8000 Hertz.

Thirty six columns are used for transport overhead. One column is used for path overhead bytes 510 and the balance of 1043 columns is used to carry data payload information. SONET uses 8 bit words. Accordingly, every four of the 14-bit words are packaged into 7 bytes of data payload for transmission using the SONET protocol. The United States version of the STS-12C SONET standard are published by the American National Standards Institute (ANSI), the entire teachings of which is incorporated herein by this reference.

Referring again to FIGS. 6A–6C, all of the data and overhead information bits are parsed into slots for transmission to a target node. The receiving node can identify which bits are data versus overhead based on a sync signal. Thus, bits in the slots can be identified based on when they are received in a frame.

A frame sync bit marks the beginning of frame and is used for multiple purposes. For example, the frame SYNC bit can mark a SONET path frame boundary, the start of a path trace, a parity accumulation boundary or a time stamp reference point.

Register J2 is used for transmitting a 64 byte message of path trace information. SONET defines a path trace string as 64 bytes of text terminated in CR, LF (carriage return, linefeed). The quasi SONET protocol and SONET protocol both transmit one byte of path trace on each frame, so the whole string gets transmitted every 64 frames. The path trace contains useful data for configuration, error checking, debugging, etc.

Register B4 is used for parity. The parity byte can contain bit interleaved parity (BIP) for the preceding frame. SONET defines BIP for the bytes in a SONET frame. This can be extended to parity check the 16 bit words transmitted between nodes over communication link 352.

Register C3 is a path label or path type. This byte carries signal label information indicating the structure of the payload. For each successive node, this byte is transparently mapped to the same register for downstream nodes. In one application, the C3 byte includes information about the existence of at the source of a Path such as a downconverter. In another application, the C3 byte can include a code for the specific type of equipment used in supporting transmission of a serial stream.

Register G2 is a dummy value transmitting unused data such as 0 to a following node.

Register F3 is a byte including subchannel and bandwidth information. This byte is transparently mapped from node to node. That is, overhead information provided at circuit 520 is maintained to a target downstream node. The F3 byte can include information for multiplexing multiple serial streams. In such an application, multiplex cards at either end of a digital interface link would use the F3 byte to verify correct modes of operation of each card at ends of the link.

Register H5 is a byte information reserved for user information. This byte is also transparently mapped to a downstream node. That is, each node in the communication system transmits the same information in a register to until it reaches an end node. Consequently, overhead information generated at a source can be used at the end node for signal reconstruction, diagnostics or control.

Hardware status bits can be used in the H byte to flow through a SONET interface card. Termination equipment such as downconverters, upconverters and other equipment can generate these bits of the H byte at serial circuit 525. These bits can enable direct hardware control of the destination equipment by commands from the source equipment. The bits also can enable transmission of serial circuit 525 source equipment status to destination equipment. This register also can be used to transmit fault status from downconverter to upconverter to cause the upconverter to shut down, preventing the transmission of faulty signals.

Registers Z6 and Z7 can be reserved for future use. Additionally, they can be use dto carry time stamp information.

Register Z8 includes a byte of information that is transparently mapped to an end node.

Data and overhead information is processed by processor 540 and digital circuit 535 such as an FPGA (Field Programmable Gate Array).

As shown, the bytes of information received for registers J2, C3, F3, H5, and Z8 map respectively to registers J1, C2, F2, H4, and Z5.

Register B4 can be used to detect errors such as lost or improperly received data bits. For example, register B4 can be used to verify checksum of received data information. If an error is detected, a counter can be incremented to track decreased system integrity. Register B4 information in circuit 535 includes the bit interleaved parity of the previous frame as generated by circuit 520. The B4 byte value received by circuit 535 is compared with the accumulated parity of bytes received by circuit 530 to detect errors.

Register G1 is used by SONET to include an Alarm Indication Signal (AIS) and Remote Error Indication (REI). When circuit 535 detects an error over DIF interface 352 (such as a parity error) or circuit 530 (such as loss of lock), it increments the remote error indication bits of G1.

Register TS-B1 is a time stamp byte 0 and register TS-B1 is a time stamp byte 1. thus, a combination of information in these registers can be a 16-bit time stamp. The time stamp registers contain the count of A/D samples since an external timing mark, such as a GPS (Global Positioning System) 1 Hz pulse.

Transmitter 545 also includes a set of 9 overhead byte register. As discussed, the registers can be based on a SONET protocol. As shown, generally all of the upstream node registers at digital circuit 540 map to those at transmitter 545 with the exception of register B3. Register B3 is generated by a framer circuit to provide parity error checking on the path between circuit 545 and circuit 560.

Data information can be reformatted by circuit 535 from 14-bit words to 8-bit words for serial transmission of the data and overhead over fiber 342. Since the data information is converted to 8-bit words, there are now 9387 8-bit words transmitted in a SONET frame.

Receiver 560 receives the data and overhead bits transmitted in a serial format. As shown, the register information maps to the registers at digital circuit 565 where they are further processed by processor 568.

At digital circuit 565, information received in registers J1, C2, E2, H4 and Z5 are mapped respectively to registers J2, C3, F3, H5 and Z8.

Register B4 is again used to carry parity information. It is used to check if a parity error occurs during transmission of data. If so, a corresponding counter is incremented to flag the error.

Register G2 can include remote error indication bits generated by circuit 535 and also the Alarm Indication Bits generated by circuit 560 and Circuit 565. The Alarm indication bits come from either parity error indicated by byte B3 or from optical communication error indicated by circuit 560.

Registers Z6 and Z7 are include time stamp information generated at circuit 535 so that a following node can identify a time delay between transmission and receipt of data.

The Z5, Z6 bytes contain time stamp information to record the exact time of the frame sync pulse as received at circuit 535. In one application, serial digital circuit 525 adds a time stamp to generated signals as they arrive from the downconverter circuit, which generates the time stamp. In another application, circuit 535 adds the time stamp to the overhead bytes.

Since a time of the frame sync and clock frequency are known, it is possible to determine the time of any data value in the serial stream. To prevent drift from degrading the time measurement and to automatically resynchronize in the event of error, the time stamp can be updated at regular intervals. In one application, the time stamp value gets added at 1 Hz from a clock provided by a GPS receiver. The maximum update rate is once per frame or 8000 times per second.

Logic in circuit 535 can record the arriving time stamp information and exact time when the corresponding frame sync pulse occurred. Circuit 565 uses a similar circuit to count clock cycles after an external time resynchronization, such as a 1 Hz GPS pulse. One embodiment can rely on the time synchronization mark occurring simultaneously at both circuits 535 and circuit 565.

Register Z5 and Z6 can form a 16 bit time stamp. Bit 15 can be used to indicate that a valid time stamp exists for a given frame. Bit 14 can be a parity bit that is used for checking errors in a time stamp between reading Z5 and Z6. Bits 13 . . . 0 can be stored time data information.

Time data can consist of the lower bits of a counter clocked at a serial rate clock rate of 42.912 MHz, which resets to zero the synchronization mark, for example, at each integer second when using 1 Hz GPS pulses. Bits to the right of the decimal point in the time stamp can be used for absolute time expressed in seconds. Higher level time processing functions can be implemented to add the time to the left of the decimal point.

Time stamps can be used for many purposes. For example, they can be used for location services and to determine a time delay in the serial interface.

A sending interface can add the time stamp and a receiving interface notes the time of arrival of time stamp with it's own accurate counter and can deduce delay, which gets reported in designated registers.

Time stamping can be performed at a point as close to the serial interface as possible. The time stamp can be inserted in Z3 and Z4, where Z3 is MSB and Z4 is LSB. Time stamp insertion can be halted. In this case, a real Z3 and Z4 byte won't be substituted and will be transmitted without changing. This mode can be used for some serial path delay measurements.

The time stamp measurement can be performed at the serial output of circuit 525. The calculated real time from transmitting to receiving the time stamp is accessible through the CPU interface. It can be valuable to know that the received value, presented in that interface will be refreshed after accessing it. If a value hasn't been read for a long time, the time stamp value may be obsolete.

The measured value can be represented in 42.912 MHz sampling rate and it is only the overhead delay. Also the drop OC12 to serial converter insert one frame (125us) overhead delay, but the data path is going without delay. So the software can take in to account the path route and to subtract 125us as many times as necessary to receive the data path delay. A maximum measured possible delay is 763us.

Delay calculations can be performed by sending timestamps in frame POH (Z3 and Z4). Time stamps can be 14 bits each as mentioned.

Time stamps can be taken by reading a current state of internal real time clocks (counters) that are set to zero by coming 1 Hz time marks. The input clock signal of such clock-counters is 77.76/2=38.88 MHz (SONET VCXO is used as a source of a duty clock signal), which results of measured delays range of ~430 millisec and resolution of ~26 nanosec.

An FPGA of a transmitting node can receive a request to send a timestamp. It will wait for the next 1 Hz mark. After having received the mark, the transmitting FPGA waits until a new frame begins and it gets to the moment of inserting a POH byte(Z3, Z4) dedicated to timestamps. Right before this moment a 14-bit word is read from the clock-counter (t1). These bits of the timestamp can be inserted into a Z bytes (two other bits are used for marking—active timestamp, must be cleared upon the receiving, etc—TBD during FPGA design). As a result, four STS-12c frames (or SPEs) carry timestamps.

An FPGA of a receiving node can detect, extract and store time stamps in an internal register (t1). At the moment of the detection, the FPGA can read the state of its clock-counter and store its content in an internal register (t2). The delay value Td=t2+(−t1) is available for the SW at the output of an adder. When add/drop action is performed, this same mechanism can be used for measuring delays between non-adjacent nodes up to whole loop delays in the SONET rings.

A measured delay does not represent the only delay for the compensation delay calculations. Other constant hardware delay values can be taken into account.

Overhead bits in registers J2, B4, C3, G2, F3, H5, Z6, Z7 and Z8 are then formatted and transmitted along with data to destination such as digital circuit 585. As previously discussed, the original RF signal received fro a corresponding base station 120 can be reproduced for driving an antenna device 160 at a radio access node 150. In a reverse direction, an RF signal carrying data information formatted for a wireless communication system can be transmitted from a radio access node and reproduced at the hub for transmission to a base station 120.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for communicating data information in a communication system, the method comprising:

receiving a signal including data information representing a digitized version of a radio frequency (RF) signal to be transmitted over a wireless link;

processing the data information to produce overhead bits supporting a serial transmission of the data information over a transport communication medium; and framing the data information of the signal and overhead bits according to a transport protocol for transmission of the data information and overhead bits in a serial stream over the transport communication medium.

2. A method for communicating data information in a communication system, the method comprising:

receiving a signal including data information representing a digitized version of a radio signal to be transmitted over a wireless link;

processing the data information to produce overhead bits supporting a serial transmission of the data information over a transport communication medium;

framing the data information of the signal and overhead bits according to a transport protocol for transmission of the data information and overhead bits in a serial stream over the transport communication medium;

recognizing that the serial stream will be re-transmitted at a following node according to a selected transport protocol; and transmitting at least a portion of the overhead bits in an allocated register of the transport protocol that will be overwritten when at least a portion of the serial stream is re-transmitted from the following node.

3. A method as in claim 2 further comprising:

upon receipt of the re-transmitted serial stream according to the selected protocol, processing the serial stream to reproduce the signal as originally received.

4. A method for communicating data information in a communication system, the method comprising:

receiving a signal including data information representing a digitized version of a radio signal to be transmitted over a wireless link;

processing the data information to produce overhead bits supporting a serial transmission of the data information over a transport communication medium;

framing the data information of the signal and overhead bits according to a transport protocol for transmission of the data information and overhead bits in a serial stream over the transport communication medium;

receiving the serial transmission over the transport communication medium; and re-transmitting the received serial transmission according to a SONET (Synchronous Optical Network) protocol.

5. A method for communicating data information in a communication system, the method comprising:

receiving a signal including data information representing a digitized version of a radio signal to be transmitted over a wireless link;

processing the data information to produce overhead bits supporting a serial transmission of the data information over a transport communication medium;

framing the data information of the signal and overhead bits according to a transport protocol for transmission of the data information and overhead bits in a serial stream over the transport communication medium, wherein the transport communication medium is a fiber optic link and the data is intended for transmission over an RF (Radio Frequency) antenna device to a mobile cellular phone user.

6. A method for communicating data information in a communication system, the method comprising:

receiving a signal including data information representing a digitized version of a radio signal to be transmitted over a wireless link;

processing the data information to produce overhead bits supporting a serial transmission of the data information over a transport communication medium;

framing the data information of the signal and overhead bits according to a transport protocol for transmission of the data information and overhead bits in a serial stream over the transport communication medium, wherein the overhead bits include time stamps.

7. A method as in claim 6, wherein the time stamps are used for location services.

8. A method as in claim 6, wherein the time stamps are used to determine a path delay.

9. A method for communicating data information in a communication system, the method comprising:

receiving a signal including data information representing a digitized version of a radio signal to be transmitted over a wireless link;

processing the data information to produce overhead bits supporting a serial transmission of the data information over a transport communication medium;

framing the data information of the signal and overhead bits according to a transport protocol for transmission of the data information and overhead bits in a serial stream over the transport communication medium;

converting the digitized RF signal for transmission over the transport communication medium;

transmitting the serial stream including data of the digitized RF signal over the transport communication medium according to a SONET (Synchronous Optical Network) protocol; and reconstructing the digitized RF signal based on receipt of the serial stream over the transport communication medium.

10. A method as in claim 1, wherein the overhead bits include parity information to identify quality of the serial stream.

11. A method for communicating data information in a communication system, the method comprising:

receiving a signal including data information representing a digitized version of a radio signal to be transmitted over a wireless link;

processing the data information to produce overhead bits supporting a serial transmission of the data information over a transport communication medium;

framing the data information of the signal and overhead bits according to a transport protocol for transmission of the data information and overhead bits in a serial stream over the transport communication medium, wherein the transport protocol is a quasi-SONET protocol that supports transmission of a serial stream of data.

12. A method for communicating data information in a communication system, the method comprising:

receiving a signal including data information representing a digitized version of a radio signal to be transmitted over a wireless link;

processing the data information to produce overhead bits supporting a serial transmission of the data information over a transport communication medium;

framing the data information of the signal and overhead bits according to a transport protocol for transmission of the data information and overhead bits in a serial stream over the transport communication medium; and generating overhead information that is included in the transport protocol for reconstructing an originally received signal.

13. A method for communicating data information in a communication system, the method comprising:

receiving a signal including data information representing a digitized version of a radio signal to be transmitted over a wireless link;

processing the data information to produce overhead bits supporting a serial transmission of the data information over a transport communication medium;

framing the data information of the signal and overhead bits according to a transport protocol for transmission of the data information and overhead bits in a serial stream over the transport communication medium, wherein the signal is a digitized RF (Radio Frequency) signal including data information transmitted over a cellular communication system.

14. A method for communicating data information in a communication system, the method comprising:

receiving a signal including data information representing a digitized version of a radio signal to be transmitted over a wireless link;

processing the data information to produce overhead bits supporting a serial transmission of the data information over a transport communication medium;

framing the data information of the signal and overhead bits according to a transport protocol for transmission of the data information and overhead bits in a serial stream over the transport communication medium;

decoding the signal to retrieve data words of a first length; and converting the retrieved data words into a second word length for serial transmission over the transport communication medium.

15. A method for communicating data information in a communication system, the method comprising:

receiving a signal including data information representing a digitized version of a radio signal to be transmitted over a wireless link; processing the data information to produce overhead bits supporting a serial transmission of the data information over a transport communication medium;

framing the data information of the signal and overhead bits according to a transport protocol for transmission of the data information and overhead bits in a serial stream over the transport communication medium: and allocating at least a portion of overhead bits to indicate a status of a corresponding link.

16. A method for communicating data information in a communication system, the method comprising:

receiving a signal including data information representing a digitized version of a radio signal to be transmitted over a wireless link;

processing the data information to produce overhead bits supporting a serial transmission of the data information over a transport communication medium;

framing the data information of the signal and overhead bits according to a transport protocol for transmission of the data information and overhead bits in a serial stream over the transport communication medium; and utilizing at least one overhead bit to control hardware at a downstream node that is used to generate an RE (Radio Frequency) signal.

17. A method for communicating data information in a communication system, the method comprising:
- receiving a signal including data information representing a digitized version of a radio signal to be transmitted over a wireless link:
- processing the data information to produce overhead bits supporting a serial transmission of the data information over a transport communication medium;
- framing the data information of the signal and overhead bits according to a transport protocol for transmission of the data information and overhead bits in a serial stream over the transport communication medium, wherein the overhead bits include path trace information to identify a source and characteristics of a received serial stream.

18. A method for communicating data information in a communication system, the method comprising:
- receiving a signal including data information representing a digitized version of a radio signal to be transmitted over a wireless link;
- processing the data information to produce overhead bits supporting a serial transmission of the data information over a transport communication medium;
- framing the data information of the signal and overhead bits according to a transport protocol for transmission of the data information and overhead bits in a serial stream over the transport communication medium; and
- configuring at least a portion of the communication system based on path trace information.

19. A method for communicating data information in a communication system, the method comprising:
- receiving a signal including data information representing a digitized version of a radio signal to be transmitted over a wireless link;
- processing the data information to produce overhead bits supporting a serial transmission of the data information over a transport communication medium;
- framing the data information of the signal and overhead bits according to a transport protocol for transmission of the data information and overhead bits in a serial stream over the transport communication medium; and
- checking for configuration errors in at least a portion of the communication system based upon path trace information.

20. A method as in claim 1 further comprising: mapping information of the signal received in a parallel format to the serial stream.

21. A system for communicating data information, the system comprising:
- a hub to receive a signal from at least one base station, the signal including data information that is to be transmitted to a target by a remote antenna device;
- a communication medium to couple the hub and the antenna device; and
- a processor device disposed in the hub that decodes the signal to produce overhead bits supporting a serial transmission of the data information over the communication medium to the remote antenna device, the data information of the signal and corresponding overhead bits being framed according to a transport protocol for transmission in a serial stream over the communication medium to the remote antenna.

22. A system as in claim 21 further comprising:
- a patch panel disposed in the hub for selecting which of multiple target antenna devices a serial stream will be directed.

23. A system as in claim 22, wherein the patch panel enables an operator to manually connect input and output ports via a cable so that a serial stream is directed to a particular antenna device.

24. A system as in claim 21, wherein the signal is a digitized RF signal and a down converter is disposed in the hub to strip away a carrier frequency.

25. A system as in claim 24, wherein the down converter processes the signal to produce the serial stream including data information.

26. A system as in claim 21, wherein the transport protocol is SONET (Synchronous Optical Network).

27. A system as in claim 21, wherein the communication medium is a fiber optic link and the data is intended for transmission over a remote RF (Radio Frequency) antenna device to a mobile cellular phone user.

28. A system as in claim 21, wherein the overhead bits include time stamps.

29. A system as in claim 28, wherein the time stamps are used for location services.

30. A system as in claim 28, wherein the time stamps are used to determine a path delay.

31. A system as in claim 21, wherein the overhead bits include parity information to identify quality of the serial stream.

32. A system as in claim 21, wherein the overhead bits include path trace information to route a signal through the system.

33. A system as in claim 21, wherein the overhead bits include path trace information to verify a configuration of equipment passing the serial stream.

34. A system as in claim 21, wherein the overhead bits include path trace information to configure equipment as a serial stream is passed through the system.

35. A method for communicating data information in a distributed RF communication system, the method comprising:
- receiving an RF signal including encoded digital data information for transmission over a wireless link;
- sampling an analog signal with an analog-to-digital converter to produce digital data words;
- processing the data information to produce overhead bits supporting a serial transmission of the data information over a communication medium; and
- framing the data words of a second length and overhead bits according to a selected transport protocol for transmission of the data information and overhead bits in a serial stream over the communication medium.

* * * * *

UNITED STATES PATENT AND TRADEMARK OFFICE
CERTIFICATE OF CORRECTION

| | |
|---|---|
| PATENT NO. | : 6,831,901 B2 |
| APPLICATION NO. | : 10/161557 |
| DATED | : December 14, 2004 |
| INVENTOR(S) | : Millar |

It is certified that error appears in the above-identified patent and that said Letters Patent is hereby corrected as shown below:

At Claim 16, Column 18, Line 66, please replace "RE" with --RF--

Signed and Sealed this

Eighteenth Day of December, 2007

JON W. DUDAS
*Director of the United States Patent and Trademark Office*